Feb. 13, 1962  R. B. WALLACE ET AL  3,020,570
METHOD OF MAKING THREADED FASTENERS WITH LOCKING INSERT THEREIN
Filed March 17, 1958  2 Sheets-Sheet 1

INVENTORS
RICHARD B. WALLACE
BY ROBERT J. EBBERT
ATTORNEYS

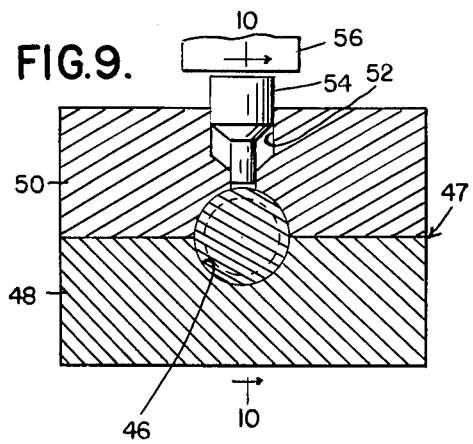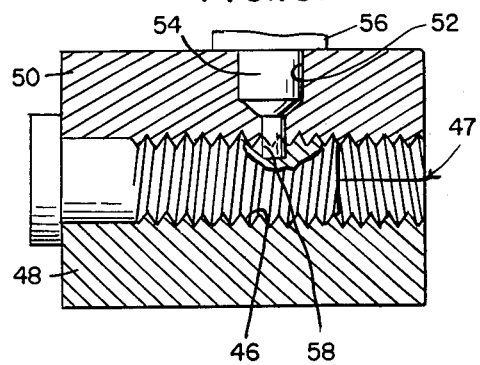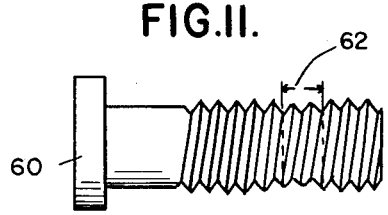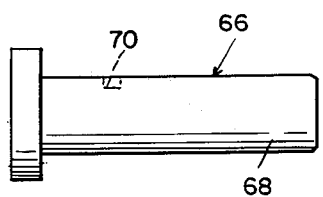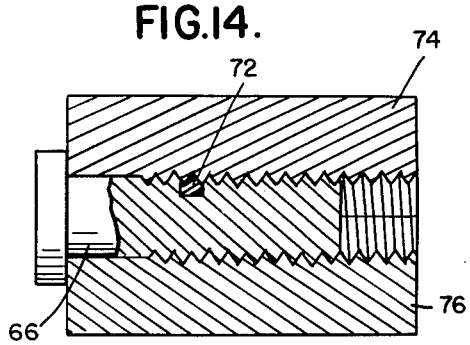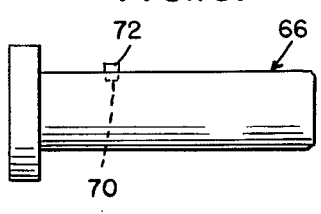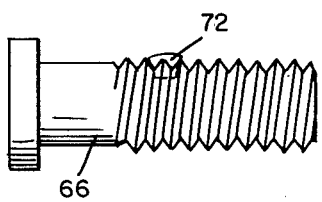

United States Patent Office 3,020,570
Patented Feb. 13, 1962

3,020,570
METHOD OF MAKING THREADED FASTENERS WITH LOCKING INSERT THEREIN
Richard B. Wallace, Birmingham, and Robert J. Ebbert, Rochester, Mich., assignors to The Oakland Corporation, Birmingham, Mich., a corporation of Michigan
Filed Mar. 17, 1958, Ser. No. 722,027
4 Claims. (Cl. 10—10)

The present invention relates to a method and apparatus for making self-sealing, self-locking threaded fasteners.

It is an object of the present invention to provide a method and apparatus for producing self-sealing, self-locking threaded fasteners in which a plastic plug is permanently secured in a recess provided in a threaded part to extend outwardly therefrom to lock and seal with a cooperating threaded member.

More specifically, it is an object of the present invention to provide a method and apparatus for producing such a device by an operation which includes recessing the member by the application of pressure through a recessing tool to cause a displacement or flow of metal.

Still more specifically, it is an object of the present invention to provide a method and apparatus as described in the preceding paragraph in which the recessing operation is accompanied or followed by an operation including the support of the area immediately surrounding the recess by a thread conforming surface so as to eliminate substantial thread distortion occasioned by the recessing operation.

Still more specifically, it is an object of the present invention to carry out the recessing operation in a plurality of steps during a thread rolling operation.

It is a further object of the present invention to provide a method and apparatus in which the recessing operation follows a threading operation and during the recessing operation the threaded member is firmly supported in a thread conforming support or die to prevent or reduce local distortion of the threads adjacent the recess.

It is a further object of the present invention to carry out the process by an operation in which the recessing step is performed on an unthreaded blank after which the blank is threaded, as for example by rolling to eliminate substantial thread distortion.

It is a further object of the present invention to provide a method and apparatus in which a blank is rolled between flat thread dies one or both of which are provided with stepped recessing projections to progressively form a recess during formation of the thread, and for inserting a cut plastic plug into the recess during the rolling operation.

Other objects and features of the invention will become apparent as the description proceeds, especially when taken in conjunction with the accompanying drawings, illustrating preferred embodiments of the invention, wherein:

FIGURE 9 is a sectional view through a two-part threaded die block for supporting a threaded part for recessing, showing the recessing tool in retracted position.

FIGURE 10 is a sectional view on the line 10—10, FIGURE 9 but showing the recessing tool in the recessing position.

FIGURE 11 is an elevational view of a threaded member modified for recessing in the apparatus illustrated in FIGURES 9 and 10.

FIGURE 12 is an elevational view of a threaded screw blank recess prior to threading.

FIGURE 13 is a view similar to FIGURE 12 showing the plastic plug inserted in the blank.

FIGURE 14 is a view of the member shown in FIGURES 12 and 13 having a thread formation rolled thereon between thread rolling dies.

FIGURE 15 is a view of the completed self-locking, self-sealing threaded fastener.

In our prior copending application Serial No. 606,321, filed August 27, 1956, now Patent No. 2,980,928, issued April 25, 1961, there was illustrated apparatus for drilling a recess in a threaded member and for inserting a cut sealing and locking plug in the recess.

The present invention relates to departures from the method disclosed in our prior application and certain improved devices for carrying out the different methods.

In accordance with the present invention a recess is provided in a threaded member by one of three somewhat different procedures. In accordance with the preferred embodiment of the present invention the recessing operation is carried out during thread rolling and preferably is accompanied by insertion of the cut plastic plug so that the threaded member requires only a single handling to provide threads thereon, to provide the recess thereon, and to insert the plastic plug into the recess. Alternatively, the recess may be provided in a blank before thread rolling by an operation in which a recessing tool is pressed into the side of the blank to cause a flow and displacement of metal. This displaced metal tends to cause radial growth of the member in the zone surrounding the recess. Following the recessing operation the part is rolled in a conventional manner, the rolling operation serving to substantially eliminate the distortion or radial growth of the part surrounding the recess.

In the two methods referred to above it is within the scope of the invention to provide some relief of the part in the area surrounding the recess to provide a space for flow of metal. This however, is not ordinarily essential for most commercial applications.

Finally, a third method relates to the forming of the recess in a previously threaded part by an operation in which the part is firmly supported by a thread conforming die at which time the recessing tool is pressed into a threaded side of the member to cause a displacement and flow of metal. This displacement and flow of metal is prevented from causing severe thread distortion in the zone surrounding the recess by the thread conforming die. Again, if desired, this operation may be carried out on a threaded member in which the zone surrounding the area to be recessed has its threads somewhat relieved to provide a volume for receiving the displaced metal during the recessing operation.

Figure 1:
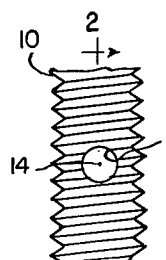
FIGURE 1 is a fragmentary elevational view of a threaded member having a plastic plug inserted in a recess therein.
Figure 2:
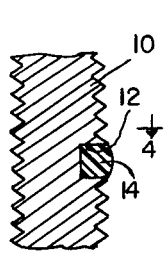
FIGURE 2 is a sectional view on the line 2—2, FIGURE 1.

Referring first to FIGURES 1 and 2 there is shown a threaded member 10 in the form of a screw or bolt having a radially extending recess 12 in a side thereof in which is received a cylindrical plug 14 of a suitable plastic material. Excellent results are obtained when inserted under pressure so that a portion thereof which projects outwardly beyond the confines of the recess 12 the threaded plug is formed of nylon. The plug 14 is is somewhat mushroomed to provide a protuberance which extends laterally somewhat beyond the sides of the recess.

The most efficient thread forming operation in common use is a thread rolling operation in which a cylindrical blank is rolled between a pair of parallel or substantially parallel flat thread rolls.

Figure 3:
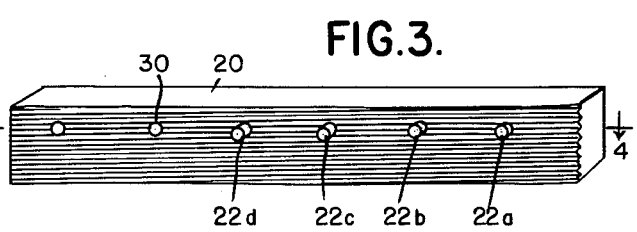
FIGURE 3 is a perspective view of a flat thread rolling die modified in accordance with the present invention.
Figure 4:
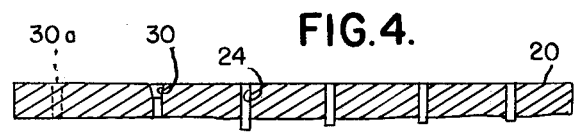
FIGURE 4 is a sectional view on the line 4—4, FIGURE 3.

In accordance with the present invention one or both of the die members, as indicated at 20 in FIGURES 3 and 4, is provided with a series of suitably spaced recessing projections 22a, 22b, 22c, and 22d, which are appropriately shaped to progressively form the recess in the side of a blank as a thread is formed thereon. Conveniently, the recessing projections 22a through 22d may be in the form of equal diameter cylindrical pins and may be progressively stepped so that the pin 22d extends further from the surface of the die than the pin 22c. Preferably, the pins 22a through 22d are received in cylindrical recesses 24 formed in the die 20 so that they may be readily adjusted for projection, or removed and replaced when worn or damaged. Actually of course, the pins need not be of circular cross-section, and may be of increasing cross-sectional area, rather than height.

Figure 5:
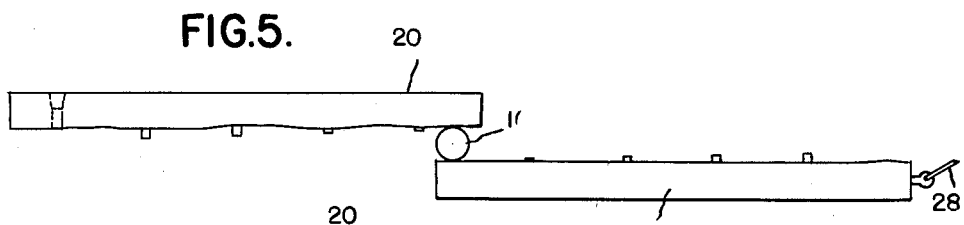
FIGURE 5 is a diagrammatic view of two thread rolling dies at the beginning of a rolling operation.
Figure 6:
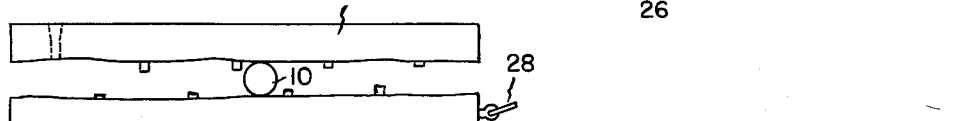
FIGURE 6 is a view similar to FIGURE 5 showing the dies in mid-stroke.
Figure 7:
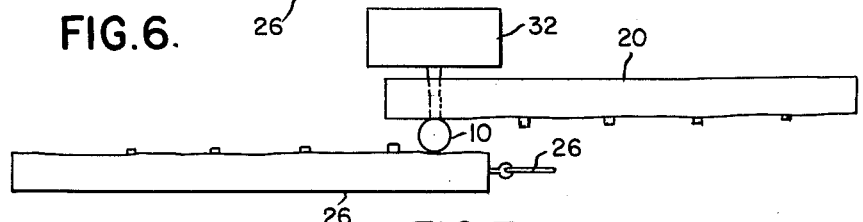
FIGURE 7 is a view similar to FIGURE 5 showing the dies at the completion of the stroke and showing the mechanism for inserting the cut plastic plug.

As best seen in FIGURES 5–7 the dies are normally arranged so that one of the dies, as for example the die 20, is stationary, whereas a second die herein designated 26 is longitudinally movable by some means such for example as a crank connector diagrammatically indicated at 28. The stationary die 20 is provided with a through opening 30 properly located to register with a recess formed in a part 10 as it is rolled across the threaded surface of the die 20 by movement of the die plate 26. If desired, the opening 30 may be spaced from the next adjacent recessing pin, indicated at 22d in FIGURE 4, by a distance such that the recess 12 formed in the threaded part 10 registers with the opening 30 upon the next succeeding revolution of the part 10. Alternatively, it may be spaced therefrom a distance requiring two complete revolutions of the pin, such a position being indicated in dotted lines at 30a. With this arrangement any displacement of metal causing a distortion of thread form resulting from the action of the pin or recessing tool 22d is substantially eliminated as the recessed portion of the tool rolls against a surface of the die. This may in some cases cause a slight inward displacement of material at the lip of the recess. This however, is not harmful and in fact may facilitate retention of the plastic plug in the recess. It will be understood that the plastic plug when pressed into the recess is capable of some plastic flow so that it will completely fill the recess and be locked therein by any slight inward projection of the lip of the recess.

The apparatus for carrying out the operation may be a conventional thread rolling device except that one of the thread dies, and preferably the stationary thread die, is provided with the progressively stepped recessing tools or pins 22a through 22d. Alternatively of course, the recessing tools or pins may be provided on both of the die plates as indicated in FIGURES 5–7, the requirement being that they are properly timed so as to engage properly into the partially formed recess as the part 10 rolls thereacross.

As best illustrated in FIGURE 7, the plug inserting mechanism indicated generally at 32 is provided adjacent the end of the stationary die plate 20. This mechanism may be substantially of the form described in our previous copending application Serial No. 606,321 to which reference is made.

Figure 8:
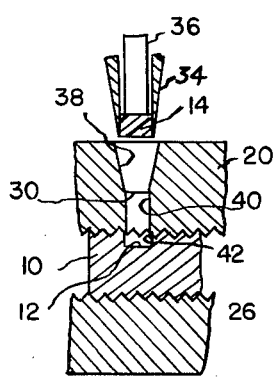
FIGURE 8 is a diagrammatic sectional view showing mechanism for cutting and applying the plastic plug.

In FIGURE 8 the essential components of this mechanism are illustrated including a tubular cutter 34 and a plunger 36. The plastic is preferably provided in a continuous strip advanced intermittently across the opening 30 in the die plate 20. The cylindrical cutter 34 is advanced in properly timed relation to cut the plug 14 from the strip. Preferably, the opening 30 in the die plate 20 has a tapered portion as indicated at 38 and terminates adjacent the threaded part 10 in a smaller cylindrical portion 40, the portion 40 being preferably of a diameter somewhat less than that of the recess 12. The plug is thus compressed to a diameter somewhat smaller than the recess as it is forced into the recess. The plunger 36 applies considerable pressure to the plug causing it to flow radially to fill the recess.

If desired, a portion of the opening 40 directly adjacent the recess 12 may be enlarged as indicated at 42 to provide for shaping the protruding portion of the plastic plug as required. As illustrated in the figure, the opening is shaped to provide an outwardly convex and laterally extending head to the plastic plug.

It will of course be understood that if desired the insertion of the plastic plug may be considered as a separate operation after the completion of the rolling and recessing operation although substantial economies are effected when the plug is inserted as an incident to the rolling and recessing operation. This avoids a separate handling of the fastener. However, if the completed article is to be heat treated it will of course be impossible to insert the plastic plug prior to heat treat. Accordingly, the operation above described except for the insertion of the plastic plug, is an efficient method of producing a threaded fastener having a recess formed into its threaded portion. Following heat treatment, the plastic plug may be inserted in a separate operation.

The apparatus illustrated in FIGURES 5–7 may also be employed to provide a recess in a previously threaded part. It will be understood that a threaded part may be rolled between the relatively movable die plates, it being necessary only to insure sufficient pressure to prevent slipping and jamming. In this case the previously rolled thread is not affected as the recess is progressively formed except that the engagement between the threads on the die plates with the portions of the fastener 10 in the area surrounding the recess substantially prevents thread distortion by flow of metal.

If exceptional circumstances require unusually close tolerance between the threads of mating parts, the blank rolled between the dies 20 and 26 may be provided with some relief at the zone where the recess is to be formed. While this relief may be provided at one side only of the blank, it is ordinarily convenient to provide it in an annular zone so that no problem of registration between the relieved zone and the recess forming projections is presented. In this case the relief groove or other shape may conveniently be rolled into the piece between the thread dies, during or before the formation of threads thereon.

As a variation of the above the method illustrated in FIGURES 9 and 10 provides for rapid production of plug receiving recesses in previously threaded parts while at the same time preventing any substantial thread distortion. In this case the previously threaded part is shown at 44 and is placed within a cavity 46 in a two-part die indicated generaly at 47 composed of a lower member 48 and an upper member 50. The cavity 46 is formed as generally semi-cylindrical recesses in the two die members and, as best illustrated in FIGURE 10, the cavity 46 is provided with a thread formation designed to conform closely to the thread on the fastener 44. The upper die is provided with an opening 52 for the reception of a recessing tool 54 the lower portion of which is reduced and may be of suitable cross-section such for example as circular, square or the like. Associated with the structure so far described is a movable actuating member 56 which may be a part of a press in which the die is received. In FIGURE 10 the member 56 is shown in the lower position having forced the recessing tool 54 inwardly to form a recess 58 in the fastener 44.

Inasmuch as the threaded portion of the fastener is tightly embraced by the thread conforming surfaces of the die 47 distortion of the previously formed threads in the area surrounding the recess 58 is substantially prevented.

It will of course be apparent that it is essential to provide the close thread conforming surfaces primarily in the zone surrounding the recess 58, and if desired the balance of the threaded fastener may be otherwise supported. However, it is convenient to provide a die recess 46 shaped to conform throughout to the threaded surface of the fastener.

While it was indicated that the conforming thread surfaces of the die prevent substantial thread distortion, it is possible to reduce this effect still further if particularly accurate thread conformation is required. In FIGURE 11 there is illustrated a fastener 60 which is to be provided with a recess in the zone indicated at 62. Within this zone the threads during their initial formation are relieved or of reduced diameter, preferably both crest and root diameters, to permit some radial growth when material is displaced to form the recess therein. While this relief of the tooth form of course need be provided only in the area fairly closely adjacent to the recess, it is most convenient to provide it in a complete annular zone at a different axial position so that when the threaded fastener is inserted in a die such as the die 47, it may be inserted to a position determined by engagement of its head portion with a suitable locating surface and without reference to the angular location of the fastener in the die. This will result in threads within the zone 62 but substantially spaced from the recess being relatively low or in clearance relation with respect to the threads of the threaded part but it will permit a very close tolerance between the remaining threads which might otherwise result in jamming.

In both of the embodiments of the invention as previously described substantial distortion of the threads in the zone surrounding the recess is prevented. This distortion may also be substantially prevented by a somewhat different method as will be described in conjunction with FIGURES 12–15. In this case the blank 66 which is to become a threaded fastener includes a cylindrical portion 68 which is provided with a recess 70 by any suitable method. Thus for example, the recess 70 may be formed by drilling or by a recessing operation similar to those described heretofore. If the recessing operation is carried out by pressing a recessing tool radially into the portion 68 of the blank, some outward displacement of metal surrounding the recess 70 will occur. This however, is not objectionable as will subsequently appear.

Following the provision of the recess 70 a plastic plug 72 is inserted into the recess 70. Thereafter, while the plug projects from the recess substantially as illustrated in FIGURE 13, the blank 66 is rolled in a conventional thread rolling operation as for example between a stationary die 74 and a longitudinally movable die 76. As indicated in FIGURE 14 this will not only form threads on the blank 66 but during the rolling operation the plastic insert 72 is substantially compressed so that it does not project outwardly beyond the threaded surface. However, it is an inherent property of most synthetic resin plastics that under these conditions, they tend to expand or resume initial volume following temporary compression. Accordingly, after the fastener is removed from the die the plastic insert grows and extends outwardly into the space above the threads produced thereon. The outward flow of plastic material may be increased by the application of heat as for example, 300 degrees Fahrenheit, thereby allowing the stress relief tendency to become more effective.

If it is desired to increase the expansion of the plastic material so as to increase the amount by which it extends outwardly of the recess still further, this may be accomplished by incorporating suitable compounding ingredients in the material effective to cause it to expand when moderately heated. A high water content in nylon, subjected to 350 degrees Fahrenheit hot oil bath to flash the water to steam expands or foams the nylon.

Due to the relatively great yieldability of the plastic insert, the rolling operation will tend to form the peripheral edges or lips of the recess 70 inwardly and thus produce a firm and positive interlock with the plastic insert. This produces a crimping action which permits less nylon to be firmly retained in a shallower hole, thus resulting in substantial economies.

The method as described in conjunction with FIGURES 12–15 may be modified by eliminating the step of inserting the plastic material prior to rolling. In this case the rolling operation will substantially eliminate the radial protrusion of metal surrounding the recess, if such has accompanied the formation of the recess, and may produce a controlled inward extension of the periphery or lip of the recess. This inward extension of the periphery or lip may of course be controlled by the shape of the recess prior to rolling. Thus for example, the inward extension of metal may be reduced by the initial provision of an inwardly tapered recess.

The drawings and the foregoing specification constitute a description of the improved method and apparatus for making self-sealing, self-locking threaded fasteners in such full, clear, concise and exact terms as to enable any person skilled in the art to practice the invention, the scope of which is indicated by the appended claims.

What we claim as our invention is:

1. The method of making a self-locking threaded element which comprises forming a radially inwardly extending slightly inwardly tapered recess in the side of a generally cylindrical body, thereafter rolling a thread on said body and simultaneously displacing radially outer portions of the side walls of said recess inwardly toward the center of said recess, and finally inserting a plug of plastic material having the property of some plastic flow into said recess under sufficient pressure to cause flow of the material to interlock it in the recess, the plug being of sufficient volume to extend outwardly beyond the open end of said recess.

2. The method of making a self-locking threaded element which comprises forming a radially inwardly extending slightly inwardly tapered recess in the side of a generally cylindrical body, thereafter rolling a thread on said body and simultaneously displacing radially outer portions of the side walls of said recess inwardly toward the center of said recess to form a radially inwardly extending retaining lip at the open end of said recess, and finally inserting a plug of plastic material having the property of some plastic flow into said recess under sufficient pressure to cause flow of the material to interlock it in the recess, the plug being of sufficient volume to extend outwardly beyond the open end of said recess.

3. The method as defined in claim 2 which comprises the step of heat treating said body after rolling the thread thereon and prior to the insertion of the plastic plug.

4. The method as defined in claim 2 which comprises forming the recess in the cylindrical body by pressing a displacement type recessing tool into said body.

References Cited in the file of this patent

UNITED STATES PATENTS

| | | |
|---|---|---|
| 2,165,009 | Rosenberg | July 4, 1939 |
| 2,539,887 | Boots | Jan. 30, 1951 |
| 2,663,344 | Burdick | Dec. 22, 1953 |